(12) United States Patent
Cox et al.

(10) Patent No.: US 7,766,285 B2
(45) Date of Patent: Aug. 3, 2010

(54) LINE HANGER

(75) Inventors: Albert R. Cox, Orland Park, IL (US);
Timothy Crawford, Country Club Hills, IL (US); Raymond Michael Horvath, Tinley Park, IL (US)

(73) Assignee: Andrew LLC, Hickory, NC (US)

( * ) Notice: Subject to any disclaimer, the term of this patent is extended or adjusted under 35 U.S.C. 154(b) by 563 days.

(21) Appl. No.: 11/033,007

(22) Filed: Jan. 11, 2005

(65) Prior Publication Data
US 2005/0184202 A1 Aug. 25, 2005

Related U.S. Application Data

(63) Continuation-in-part of application No. 10/287,667, filed on Nov. 4, 2002, now Pat. No. 7,025,309.

(51) Int. Cl.
*F16L 3/00* (2006.01)
(52) U.S. Cl. .................. 248/74.2; 248/74.4; 248/63; 248/302; 248/305
(58) Field of Classification Search .............. 248/74.1, 248/74.2, 74.4, 62, 63, 302, 303, 316.7, 305
See application file for complete search history.

(56) References Cited

U.S. PATENT DOCUMENTS

| | | | |
|---|---|---|---|
| 333,119 A | 12/1885 | Ephraim | |
| 619,915 A | 2/1899 | Wentworth | |
| 1,311,628 A | 7/1919 | Walsh | |
| 1,720,746 A | 7/1929 | Povlsen et al. | |
| 1,963,908 A | 6/1934 | Manasek | 248/31 |
| 2,014,971 A | 9/1935 | Knutson | |
| 2,273,571 A | 2/1942 | Hafemeister | 248/62 |
| 2,375,513 A | 5/1945 | Bach | 248/59 |
| 2,547,813 A | 4/1951 | Coons et al. | 248/74 |
| 2,577,120 A | 12/1951 | Franz | 211/71 |
| 2,767,946 A | 10/1956 | Weeks | 248/50 |
| 2,846,174 A | 8/1958 | Sewell | 248/223 |
| 2,893,698 A | 7/1959 | Nunninghoff | 257/1 |
| 2,972,460 A | 2/1961 | Kenyon | 248/62 |
| 3,185,418 A | 5/1965 | Appleton | 248/72 |
| 3,275,274 A | 9/1966 | Hutcheon | 248/309 |
| 3,295,807 A | 1/1967 | Von Volkli | 248/74 |
| 3,310,264 A | 3/1967 | Appleton | 248/72 |
| 3,385,545 A | 5/1968 | Patton | 248/68 |

(Continued)

FOREIGN PATENT DOCUMENTS

CA 1 172 231 8/1984

*Primary Examiner*—J. Allen Shriver, II
*Assistant Examiner*—Steven M Marsh
(74) *Attorney, Agent, or Firm*—Wood, Herron & Evans LLP

(57) ABSTRACT

A line hanger for securing lines, such as transmission, pneumatic, hydraulic, electrical and other types of lines, to a support structure. The line hanger includes a wire structure with an attachment section configured for mounting to the support structure and a pair of clamping arms depending outwardly from the attachment provision. The clamping arms are configured to resiliently separate to receive a line and to resiliently relax for applying a clamping force to secure the line. The clamping arms are clasped together by engaging hook members defined at the open end of the wire structure. Multiple line hangers may be interlinked or stacked relative to the support structure for support multiple lines.

9 Claims, 8 Drawing Sheets

U.S. PATENT DOCUMENTS

| | | | |
|---|---|---|---|
| 3,547,385 A | 12/1970 | Kindorf | 248/62 |
| 4,286,654 A | 9/1981 | Ruhe et al. | 165/172 |
| 4,306,697 A | 12/1981 | Mathews | 248/68 |
| 4,324,381 A * | 4/1982 | Morris | 248/311.2 |
| 4,325,526 A | 4/1982 | Kitagawa | 248/73 |
| 4,479,625 A | 10/1984 | Martz | |
| 4,493,468 A | 1/1985 | Roach | 248/62 |
| 4,654,612 A | 3/1987 | Smith | 333/248 |
| 4,750,651 A | 6/1988 | Jan | 223/89 |
| 4,763,132 A | 8/1988 | Juds et al. | 343/890 |
| 4,790,060 A | 12/1988 | Council et al. | 29/525.1 |
| 4,909,467 A | 3/1990 | Shan-Pao | 248/312 |
| 4,958,792 A | 9/1990 | Rinderer | 248/74.2 |
| 5,108,055 A | 4/1992 | Kreinberg et al. | 248/71 |
| 5,188,609 A | 2/1993 | Bayless et al. | 604/180 |
| 5,393,021 A | 2/1995 | Nelson | 248/71 |
| 5,533,696 A | 7/1996 | Laughlin et al. | 248/74.2 |
| 5,971,329 A | 10/1999 | Hickey | 248/68.1 |
| D417,353 S | 12/1999 | Laga | D6/566 |
| 6,161,804 A | 12/2000 | Paske et al. | 248/74.1 |
| 6,172,654 B1 | 1/2001 | Martek | 343/893 |
| 6,244,545 B1 | 6/2001 | McCrary | 248/73 |
| 6,354,543 B1 | 3/2002 | Paske | 248/68.1 |
| 7,025,309 B2 * | 4/2006 | Goodwin et al. | 248/74.4 |
| 2002/0000504 A1 * | 1/2002 | Bayne | 248/302 |

* cited by examiner

LINE HANGER

This application is a continuation-in-part of U.S. patent application Ser. No. 10/287,667 filed Nov. 4, 2002 now U.S. Pat. No. 7,025,309 and entitled LINE HANGER, the disclosure of which is fully incorporated herein by reference.

FIELD OF THE INVENTION

This invention relates generally to devices for hanging lines and, in particular, to hangers for securing transmission, pneumatic, hydraulic, electrical, and other lines to support structures.

BACKGROUND OF THE INVENTION

Line hangers are commonly used to secure lines, such as cables and transmission lines, to the framework of support structures, such as antenna towers. Lines are routed upward from the base of the antenna tower to communicate with telecommunications devices positioned above the base either at the tower apex or at an intermediate location. Generally, each line is attached to the antenna tower by a large number of line hangers mounted at periodically-spaced locations along its height. Antenna towers may reach several hundred feet in height with line hangers mounted at about three feet intervals. After the line hangers have been installed, the line is strung and engaged with the line hangers. Certain line hangers are constructed to be stackable such that multiple line hangers can be interlocked to extend outwardly from the antenna tower. Stacked line hangers significantly increase the number of lines that can be routed up the antenna tower by making efficient use of the available attachment points.

Conventional line hangers suffer from significant deficiencies and shortcomings. In particular, most line hangers are complex structures that are costly to manufacture due to the costs of raw materials, manufacturing equipment and labor. In addition, conventional line hangers require a large amount of auxiliary hardware, such as screws, bolts, nuts and washers. Stacked line hangers may require at least partial disassembly of existing line hangers to add another line. As a result, running lines along the height of antenna towers is time-consuming, labor-intensive and expensive.

Therefore, it would be desirable to have a line hanger characterized by a simple, inexpensive construction.

DETAILED DESCRIPTION OF THE INVENTION

Although the invention will be described in connection with certain embodiments, it will be understood that the invention is not limited to those embodiments. On the contrary, the description of the invention is intended to cover all alternatives, modifications, and equivalent arrangements as may be included within the spirit and scope of the invention as defined by the appended claims.

Figure 1:
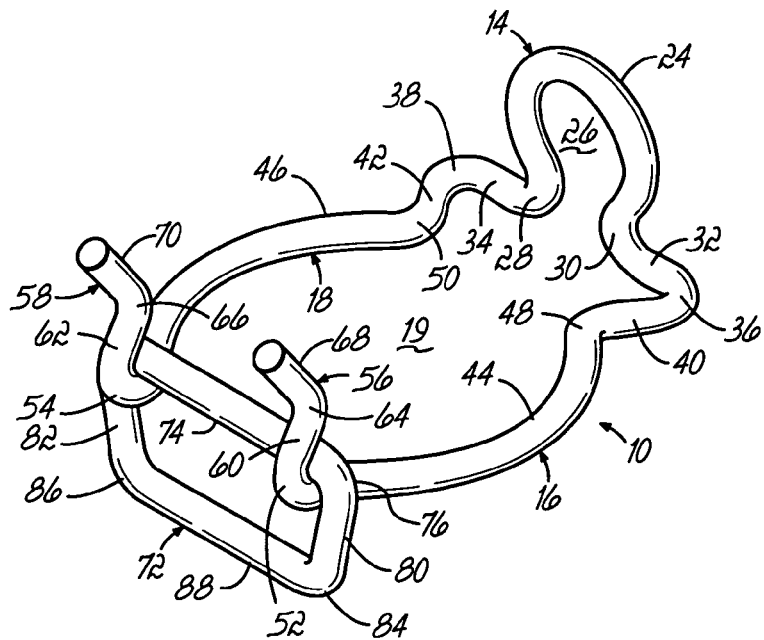
FIG. 1 is a perspective view of a line hanger in accordance with the principles of the invention.

With reference to FIG. 1, a mounting device or line hanger 10 according to the principles of the invention is a multi-bend, three-dimensional structure formed from a continuous length of wire or rod. The rod has a diameter suitable for providing adequate rigidity to function as a load-bearing structure as well as sufficient resiliency. The rod forming the line hanger 10 is generally circular in radial cross-section. Line hanger 10 may be formed from any suitable material including, but not limited to, metals such as stainless steels and galvanized steels. For light duty applications, the line hanger 10 may be molded from a polymer resin. The line hanger 10 may be a one-piece monolithic structure that is unitary or may be formed from multiple components joined together by, for example, welded or fused junctions.

With reference to FIG. 1, the line hanger 10 includes a support attachment provision or section, generally indicated by reference numeral 14 and a pair of clamping arms 16, 18 of comparable length that define an area or space 19 for receiving and securing a line 20, typically cylindrical, selected from among various different types, such as a transmission line, a pipe, a conduit or the like. The attachment section 14 of the line hanger 10 is configured to be attached with a conventional fastener 22 to a support structure 21, such as a portion of an antenna tower. Alternatively, the clamping arms 16, 18 of one line hanger 10 may be coupled with the attachment section 14 of another line hanger 10 for stacking multiple cable hangers 10. The line hanger 10 may be attached to support structure 21 vertically, horizontally or at angle to an axis of the support structure 21 using any conventional bracket 23.

Multiple line hangers 10, each the same or similar to line hanger 10, are attached to the support structure 21 with a spacing between adjacent line hangers 10 adequate to resist forces due to wind and weather. Then, the line 20 is strung up the support structure 21 and a length of the line 20 is secured to each of the multiple line hangers 10. The rigidity of each individual line hanger 10 must be adequate to support its distributed portion of the total load from the attached line 20 including external forces, such as wind, acting on the line 20 and any additional load from stacked line hangers 10 and their respective lines 20, as will be described below. The resiliency of the line hanger 10 must be sufficient to allow the line hanger 10 to be coupled with the line 20, as described below.

The attachment section 14 of line hanger 10 defines a closed end that includes a round or circular loop 24 having a central passage 26 with a diameter greater than or equal to a diameter of a threaded shank of the fastener 22 and less than an outer diameter of a head of the fastener 22. The loop 24 extends over an arc length of less than 360° terminated by a transversely-spaced pair of oppositely-directed angled bends 28, 30 that define a gap in loop 24 dimensioned to prevent vertical passage of the threaded shank of the fastener 22. It is contemplated by the invention that the loop 24 may possess any arcuate or polygonal shape suitable to cooperate with the fastener 22 for securing the line hanger 10 with the support structure 21. Extending outwardly from each of the angled bends 28, 30 is a corresponding one of a pair of substantially-linear widening legs or segments 32, 34 of comparable length. Extension segment 32 extends outwardly from loop 24 in an opposite direction from extension segment 34. The loop 24 and extension segments 32, 34 lie substantially in a common vertical plane, the angled bends 28, 30 are obtuse angles, and the extension segments 32, 34 are substantially collinear.

With continued reference to FIG. 1, each of the extension segments 32, 34 is coupled by a respective one of shoulders or angled bends 36, 38 with a corresponding one of a pair of short bridging legs or segments 40, 42 of comparable length. The bridging segments 40, 42 depend away from the extension segments 32, 34 in a horizontal plane generally orthogonal to the vertical plane containing the loop 24 and the extension segments 32, 34. The bridging segments 40, 42 operate to separate the loop 24 horizontally from the clamping arms 16, 18 to provide an empty space for receiving the head of the fastener 22. As a result, the head of the fastener 22 does not interfere with the securement of the line 20 with the line hanger 10. The separation also facilitates stacking of multiple line hangers 10, as described below.

Generally, the clamping arms 16, 18 depend outwardly from the attachment section 14 with a transverse relationship to the attachment section 14. Each of the clamping arms 16, 18 has a respective arcuate leg or segment 44, 46 joined by a corresponding one of a pair of angled bends 48, 50 with a respective one of the bridging segments 40, 42. The arcuate segments 44, 46 and the bridging segments 40, 42 generally lie in a common horizontal plane. The arcuate segments 44, 46 are curved into a concave-convex shape with inwardly confronting sides being concave so as to share a common radius of curvature relative to the center of the space 19 between the clamping arms 16, 18. The radius of curvature corresponds generally to the radius of the line 20. Each of the arcuate segments 44, 46 is joined by a respective one of the pair of angled bends 52, 54 with a corresponding one of a pair of hooks or upright members 56, 58 that depend upwardly from the horizontal plane containing the arcuate segments 44, 46.

Each of the upright members 56, 58 includes a respective one of a pair of relatively short legs or segments 60, 62 of comparable length that depend inwardly toward the loop 24 joined by a respective one of a pair of angled bends 64, 66 with a corresponding one of a pair of relatively long legs or segments 68, 70. Segments 68, 70 are each inclined outwardly and away from the corresponding one of arcuate segments 44, 46. The spacing between the upright members 56, 58 and the spacing between the angled bends 52, 54 is similar to the spacing between the confronting concave sides of angled bends 36, 38 of the attachment section 14. As a result, the attachment section 14 effectively operates as a terminating element for interconnecting the clamping arms 16, 18 to prevent relative separation when line 20 is secured therebetween.

The clamping arms 16, 18 are resiliently separable or spreadable between a relaxed condition in which no line 20 is present, a spread condition that permits insertion of the line 20 into the widened throat or gap between upright members 56, 58, and a clamping condition intermediate between the relaxed and spread conditions in which the clamping arms 16, 18 collectively apply an inwardly-directed clamping force for securing line 20 with the line hanger 10. To couple the line 20 with the line hanger 10, the line 20 is positioned proximate the gap between the upright members 56, 58 and moved inwardly in a direction generally toward the loop 24. Sliding contact between the exterior of the line 20 and the upright members 56, 58 causes the clamping arms 16, 18 to resiliently deflect outwardly or separate from the relaxed condition to the spread condition so that the line 20 can pass between the upright members 56, 58. As the line 20 is moved into the space 19, the clamping arms 16, 18 relax inwardly to the clamping condition in which the clamping arms 16, 18 apply an inward clamping force to the line 20. The clamping force applied by the clamping arms 16, 18 grips line 20 with a clamping force sufficient to prevent significant axial movement of the line 20 relative to line hanger 10.

With continued reference to FIG. 1, a terminating link or element 72, formed from a trapezoidal loop of wire or rod, is provided that is capable of being removably coupled with the line hanger 10. To that end, the inner periphery of the terminating element 72 is dimensioned to fit over the upright members 56, 58 so that the terminating element 72 can be installed on the clamping arms 16, 18 after a line 20 is positioned in space 19. The terminating element 72 includes a long segment 74 joined at opposite ends by one of a pair of angled bends 76, 78 (FIG. 3) with a corresponding one of two relatively short segments 80, 82. A respective one of two angled bends 84, 86 joins a respective one of the short segments 80, 82 with another relatively long segment 88 that is aligned generally parallel with long segment 74. When the terminating element 72 is engaged with the line hanger 10, the angled bends 76, 78 engage the angled bends 52, 54 of the line hanger 10. The terminating element 72 constrains the clamping arms 16, 18 against relative deflection so that the line 20 cannot be disengaged from the line hanger 10 by movement outwardly through the gap between the upright members 56, 58 and also operates to maintain the clamping force of the clamping arms 16, 18 securing the line 20 against significant axial movement relative to line hanger 10.

The line hanger 10 of the invention may be readily scaled to accept and secure lines 20 of differing sizes. In particular, the dimensions of the line hanger 10 of the invention may be scaled to accept lines 20 of various different diameters or to accept lines 20 having a range of diameters. In addition, the clamping arms 16, 18 can accept lines 20 within a range of dimensions. Generally, the separation of the clamping arms 16, 18 in the relaxed condition determines the minimum diameter of line 20 that may be secured in the clamping position. The clamping arms 16, 18 are spreadable to supporting lines 20 up to a maximum dimension determined by the resiliency and ability to separate the clamping arms 16, 18. In addition, the diameter of the wire or rod forming line hanger 10 is selected and the dimensions are adjusted such that transitions among the relaxed, spread and clamping conditions does not result in significant permanent deformation of the material forming the clamping arms 16, 18.

Figure 2:
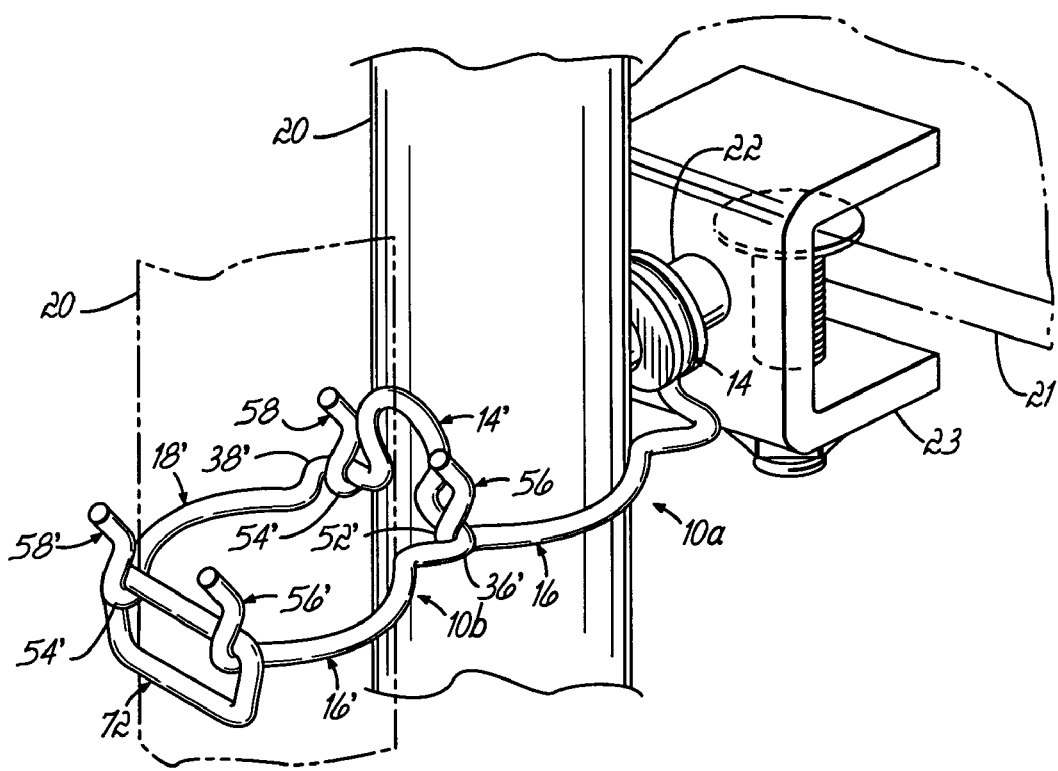
FIG. 2 is a front perspective view of a pair of line hangers of FIG. 1 stacked according to the principles of the invention.
Figure 3:
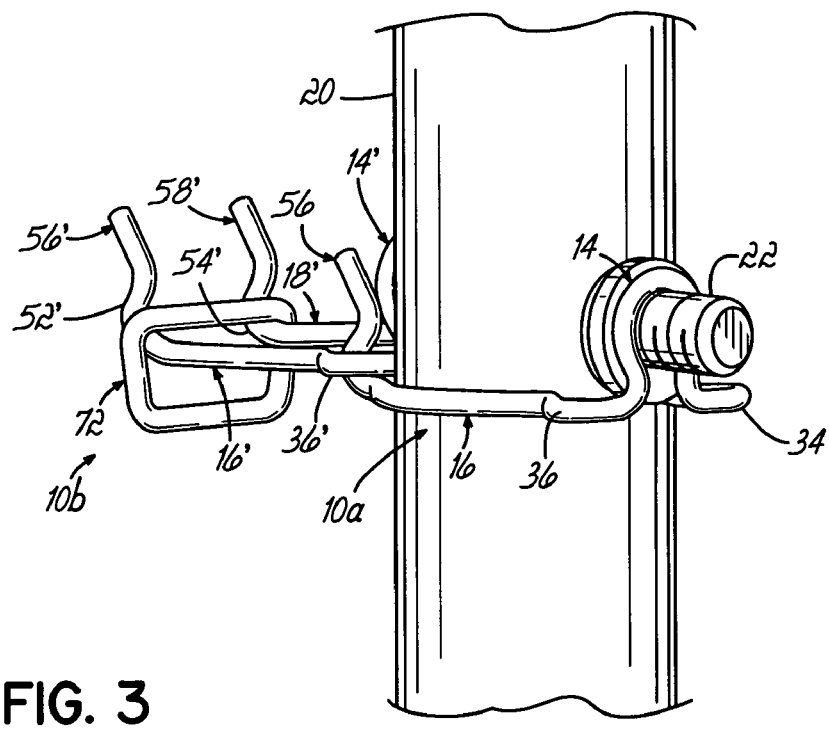
FIG. 3 is a rear perspective view similar to FIG. 2.

With reference to FIGS. 2 and 3, the line hanger 10 of the invention is stackable in that a second line hanger 10b can be mounted to a first line hanger 10a, which is itself attached to the support structure 21. Each of the line hangers 10a and 10b is the same of similar to line hanger 10. In the following description, reference numerals representing features of the second line hanger 10b will be distinguished by prime notation from reference numerals representing the same or similar features of the first line hanger 10a. The distance between the confronting concave portion of angled bends 36', 38' of the second line hanger 10b in the clamping condition is greater than the distance separating the upright members 56, 58 of the first line hanger 10a. The extension segments 32', 34' of the second line hanger 10b contact and are supported by a corresponding one of clamping arms 16, 18 adjacent to the respective one of angled bends 52, 54. The second line hanger 10b is secured against cantilevering by the contact between loop 24 and the line 20 held by the first line hanger 10a. The interconnection between the angled bends 36', 38' of line hanger 10b and the angled bends 52, 54 of the upright members 56, 58 of line hanger 10a prevents inadvertent spreading of the clamping arms 16, 18.

In use, a set of line hangers 10a are fastened with fasteners 22 to the support structure 21 at successive spaced attachment points between the base of the support structure 21 and the destination of the line 20. The line 20 is strung upwardly proximate to the line hangers 10a and the line 20 is pressed inwardly between the upright members 56, 58 of each line hanger 10a which provides a temporary spreading force that separates the respective clamping arms 16, 18 from their initial relaxed condition to the spread condition. As the line 20 moves into the space 19 between the respective clamping arms 16, 18, the clamping arms 16, 18 relax inwardly to create the clamping condition for securing the line 20 against movement. The clamping arms 16, 18 of each line hanger 10a are safeguarded against spreading by the placement of a corresponding terminating element 72. Alternatively, one or more additional sets of line hangers 10b may be stacked to the first set of line hangers 10a for directing one or more additional lines 20 along the support structure 21 and the mounting sequence is repeated for each additional line 20. The last stacked set of line hangers 10b is terminated, after the corresponding line 20 is inserted, with a corresponding plurality of terminating elements 72.

Figure 4:
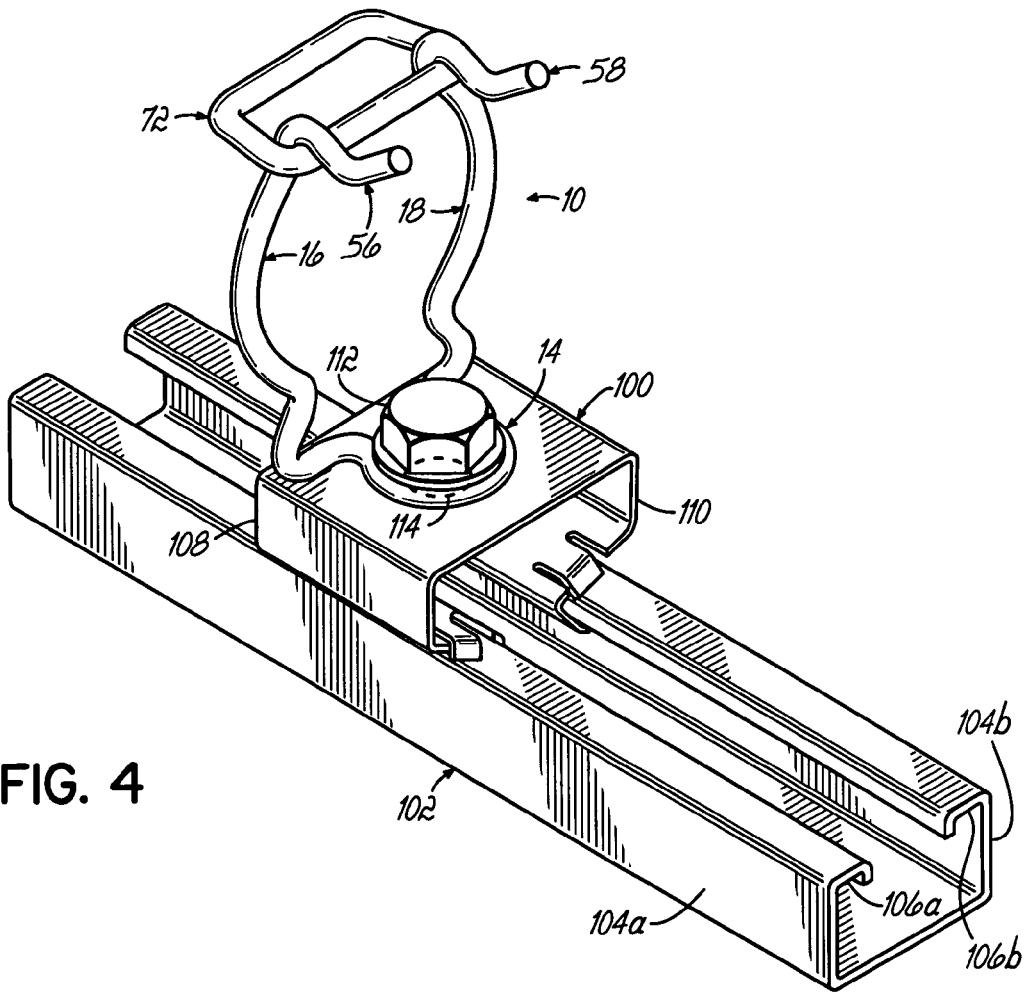
FIG. 4 is a perspective view of the line hanger of FIG. 1 mounted to an exemplary anchor rail using an adapter.

With reference to FIG. 4 in which like reference numerals refer to like features in FIGS. 1-3, an adapter 100 may be utilized for securing the line hanger 10 of the invention with an anchor rail 102 or other anchor accessory, such as UNISTRUT® brand framing members, bracket and fittings. The anchor rail 102 is formed as a U-shaped channel having a pair of upstanding, opposing legs 104a, 104b in which each of the legs 104a, 104b terminates in a respective downwardly-oriented lip 106a, 106b. The adapter 100 includes a pair of flexible mounting legs 108, 110 each configured for engaging a corresponding one of lips 106a, 106b. Adapters 100 suitable for use in the invention are disclosed in International Application Number PCT/US02/23781, which is hereby incorporated by reference herein in its entirety. The attachment section 14 of line hanger 10 is secured with a suitable fastener 112 to a threaded opening 114 in the adapter 100. Additional line hangers (not shown) may be coupled with line hanger 10, as illustrated in FIG. 2, to create a stacked or chained arrangement.

Figure 5:
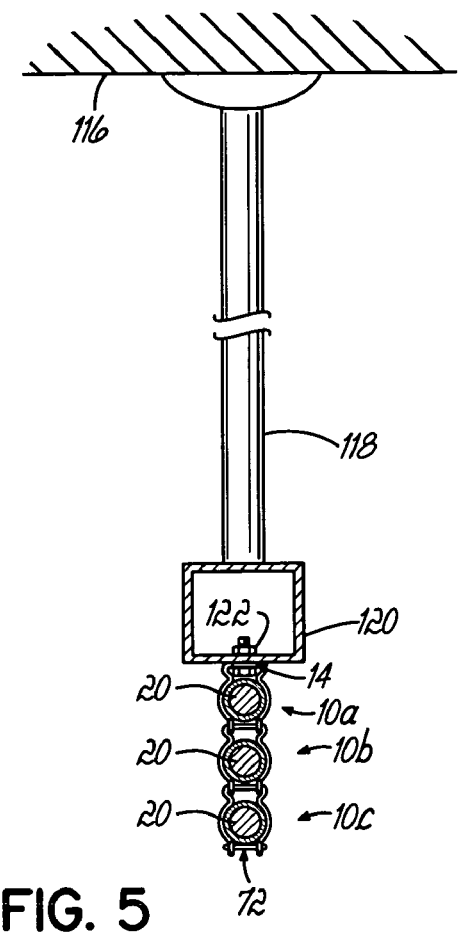
FIG. 5 is a side view of a stacked plurality of the line hangers of FIG. 1 suspended from a ceiling.

With reference to FIG. 5 in which like reference numerals refer to like features in FIGS. 1-3, a plurality of, for example, three line hangers 10a, 10b, 10c, each the same or similar to line hanger 10, may be supported or hung vertically from a ceiling or other support surface 116 by, for example, a rod 118 in a stacked or chained arrangement. In such a stacked or chained arrangement, a coupling element 120 may be used to couple a first line hanger 10a to rod 118 using a fastener 122. Line hanger 10b is stacked or hung from the first line hanger 10a and line hanger 10c is stacked or hung from line hanger 10b to form the stacked arrangement. Terminating element 72 is used to terminate the last line hanger 10c in the stack. Each of the line hangers 10a, 10b, 10c supports and secures a corresponding one of multiple lines 20. The invention contemplates that the first line hanger 10a may be hung directly from the rod 118 without the intervening coupling element 120. To that end, the attachment section 14 of the first line hanger 10a may receive a threaded end of rod 118, with a mating element (not shown) provided to secured the first line hanger 10a with the rod 118. It is contemplated by the invention that two or more line hangers 10 may form the stacked arrangement.

Figure 6:
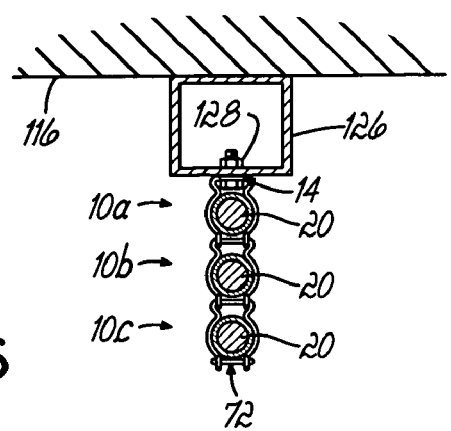
FIG. 6 is a side view similar to FIG. 5 in which a different ceiling mount is illustrated.

With reference to FIG. 6 in which like reference numerals refer to like features in FIG. 5, the plurality of line hangers 10a, 10b, 10c may be suspended in a stacked arrangement from the support surface 116 with the cooperation of an intervening coupling element 126. A first line hanger 10a is secured with, for example, a fastener 128 to the coupling element 126, which is itself secured in a conventional manner to the support surface 116. Additional hangers 10b and 10c are stacked from the first line hanger 10a to provide the stacked arrangement. Terminating element 72 is used to terminate the last line hanger 10c in the stack. Each of the line hangers 10a, 10b, 10c supports and secures a corresponding one of multiple lines 20.

Figure 7:
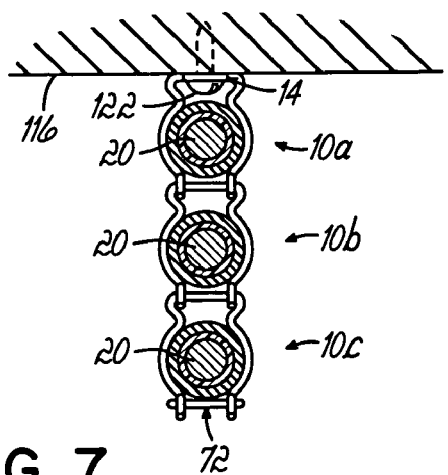
FIG. 7 is a side view of a stacked plurality of line hangers of FIG. 1 suspended from a mount supported by an overhead conduit.

With reference to FIG. 7 in which like reference numerals refer to like features in FIGS. 5 and 6, the plurality of line hangers 10a, 10b, 10c may be supported or hung vertically from the support surface 116 by direct attachment in a stacked arrangement. In this stacked arrangement, a fastener 130 is used to directly couple the attachment section 14 of a first line hanger 10a to the support surface 116. Line hanger 10b is stacked or hung from the first line hanger 10a and line hanger 10c is stacked from line hanger 10b, as appropriate, to form the stacked arrangement. Terminating element 72 is used to terminate the last line hanger 10c in the stack. Each of the line hangers 10a, 10b, 10c supports and secures a corresponding one of multiple lines 20.

Figure 8:
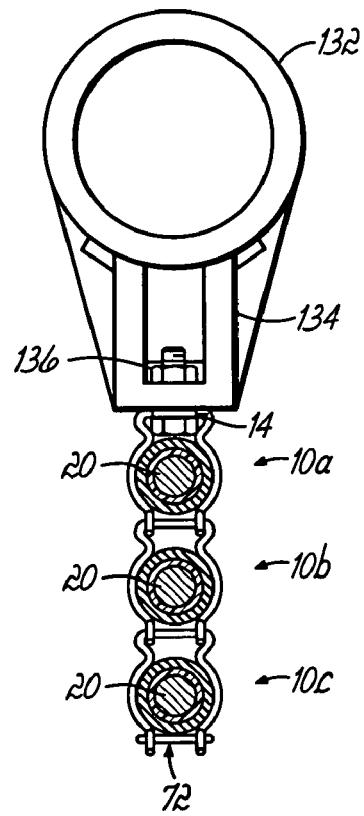
FIG. 8 is a side view of a stacked plurality of line hangers of FIG. 1 in which the first line hanger in the stack is directly mounted to a support surface.

With reference to FIG. 8 in which like reference numerals refer to like features in FIGS. 5-7, the plurality of line hangers 10a, 10b, 10c may be suspended from a cylindrical overhead conduit 132, such as a pipe or a line, using a coupling element 134 configured to engage the conduit 132. A first line hanger 10a is secured with, for example, a fastener 136 to the coupling element 134. The coupling element 134 is itself secured in a conventional manner to the overhead conduit 132. Additional hangers 10b and 10c are stacked from the first line hanger 10a to create a stacked arrangement. Terminating element 72 is used to terminate the last line hanger 10c in the stack. Each of the line hangers 10a, 10b, 10c supports and secures a corresponding one of multiple lines 20.

Figure 9:
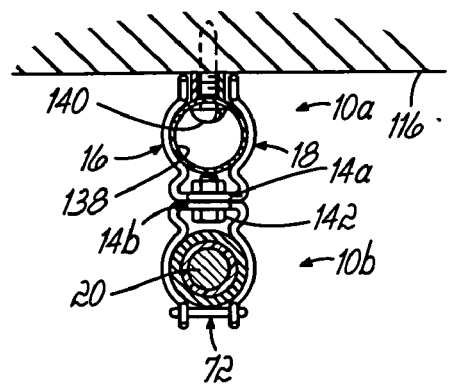
FIG. 9 is a side view similar to FIG. 8 in which the first line hanger is mounted to a conduit fastened to the support surface.

With regard to FIG. 9 in which like reference numerals refer to like features in FIGS. 5-8, a first line hanger 10a may be suspended from an overhead conduit 138, such as a pipe or a line. The first line hanger 10a is secured by its clamping arms 16, 18 about the cylindrical outer surface of the overhead conduit 138, which is itself secured in a conventional manner, such as the illustrated fastener 140, to the support surface 116. An attachment section 14b of the second line hanger 10b is secured with an attachment section 14a of the first line hanger 10a using a fastener 142 to provide an initial stacked pair. Additional line hangers (not shown) may be stacked from the second line hanger 10b as described herein. Terminating element 72 is used to terminate the last line hanger 10b in the stack. Each of the line hangers 10a, 10b, 10c supports and secures a corresponding one of multiple lines 20.

Figure 10:
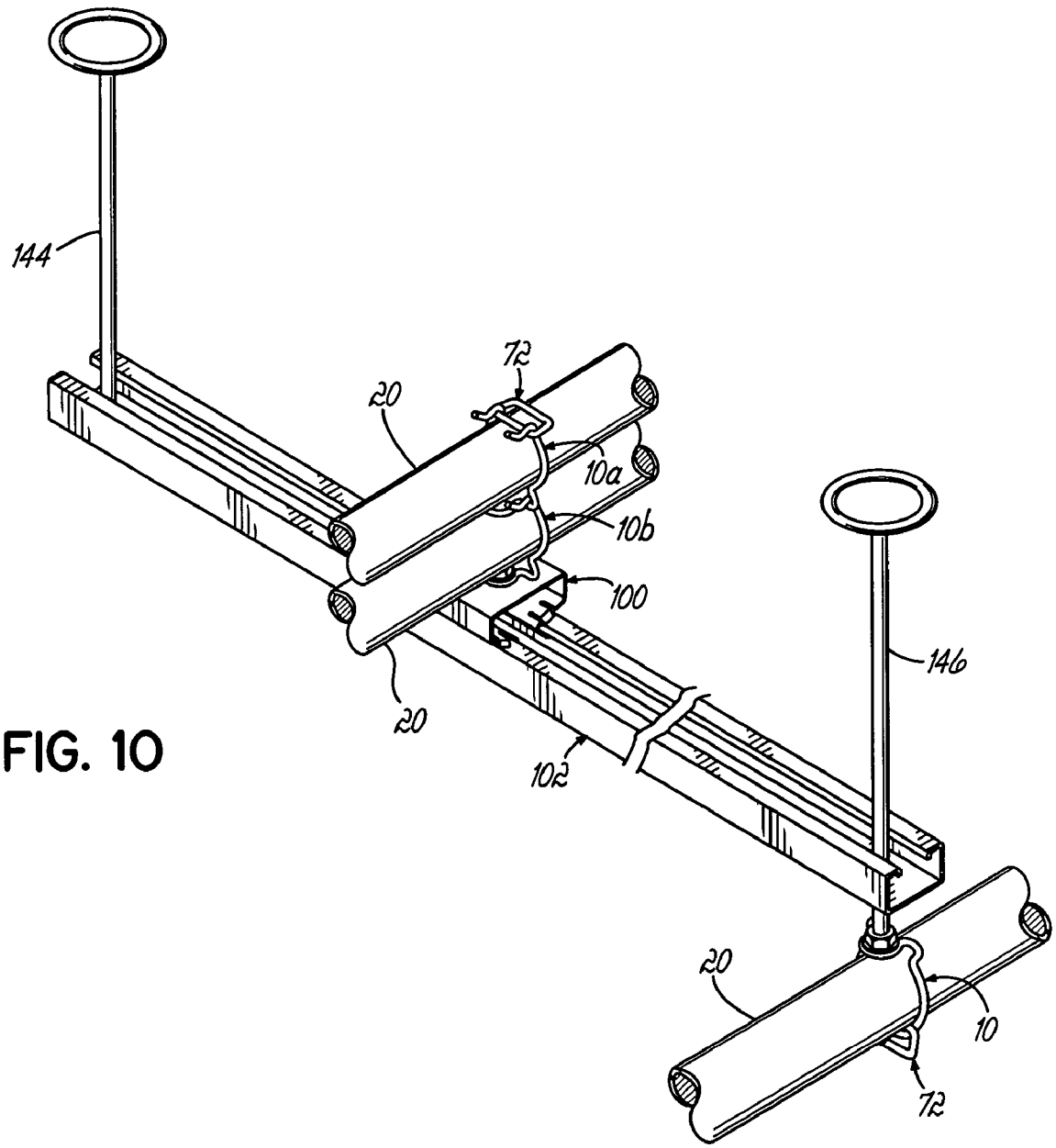
FIG. 10 is a perspective view of line hangers according to FIG. 1 attached to an anchor rail used as a trapeze support and showing still another configuration in which an adapter is present.

With regard to FIG. 10 in which like reference numerals refer to like features in FIGS. 5-9, line hanger 10 may be coupled with a trapeze support, such as formed by anchor rail 102 supported at opposite ends by, for example, a pair of threaded rods 144, 146 secured to and suspended from a support surface 116 (FIG. 9). This type of trapeze support is commonly used for supporting lines 20, such as conduit, piping and the like. It is apparent, as described herein, that the line hanger 10 may be used in conjunction with anchor rail 102 for supporting multiple lines 20 either singularly or in stacked arrangements, or using suitable adapters, such as adapter 100 described herein.

Figure 11:
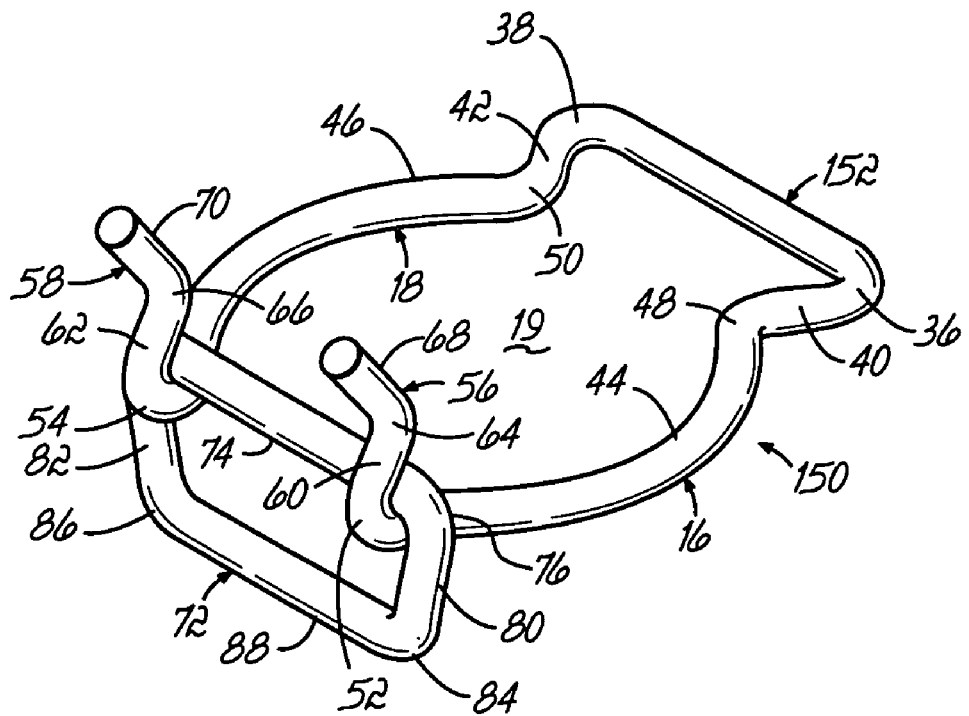
FIG. 11 is a perspective view of an alternative embodiment of a line hanger in accordance with the principles of the invention.

With reference to FIG. 11 in which like reference numerals refer to like features in FIGS. 1-3, a line hanger 150 is provided that is substantially the same or similar to line hanger 10 other than modifications made to attachment section 14. Specifically, line hanger 150 is provided with an attachment section 152 in which angled bends 36, 38 are connected by a linear segment 154. Line hanger 150 may be stacked, as described above, with other line hangers 10 by engaging the angled bends 36, 38 of line hanger 150 and the angled bends 52, 54 of the upright members 56, 58 of another line hanger (not shown but the same or similar to line hanger 10) so that linear segment 154 extends between the upright members 56, 58.

Figure 12:
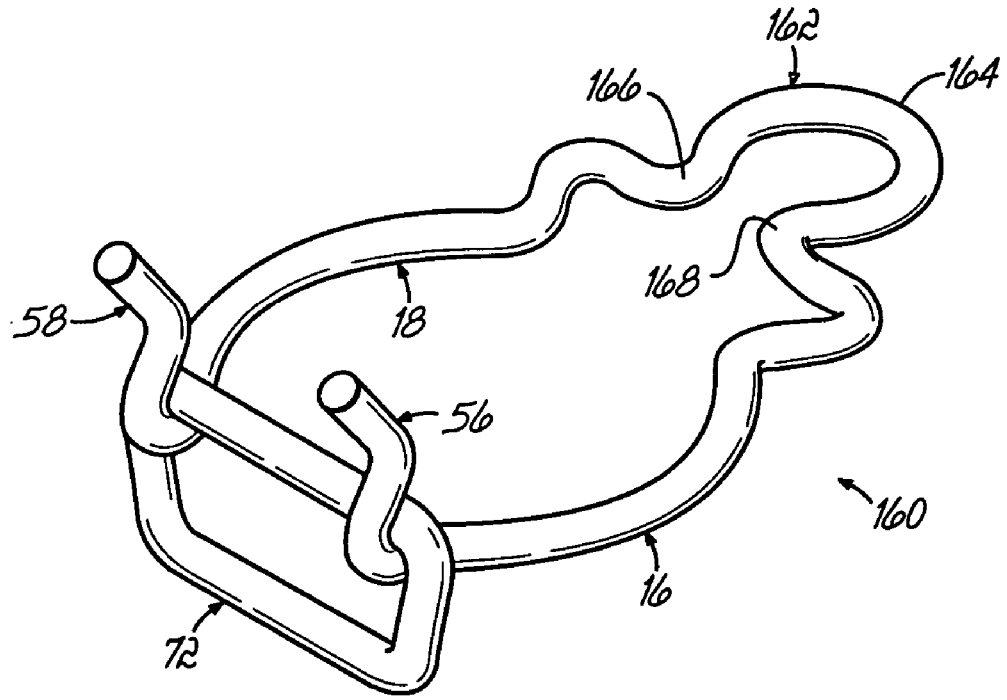
FIG. 12 is a perspective view of an alternative embodiment of a line hanger in accordance with the principles of the invention.

With reference to FIG. 12 in which like reference numerals refer to like features in FIGS. 1-3, a line hanger 160 is substantially the same or similar to line hanger 10 other than modifications made to attachment section 14. Specifically, line hanger 160 is provided with an attachment section 162 including a round or circular loop 164 which is substituted for the loop 24 of line hanger 10. Angled bends 166, 168 are bent such that the loop 164 is substantially coplanar with clamping arms 16, 18. The loop 164 receives a fastener (not shown) for securing the line hanger 160 to a support structure (not shown).

Figure 13:
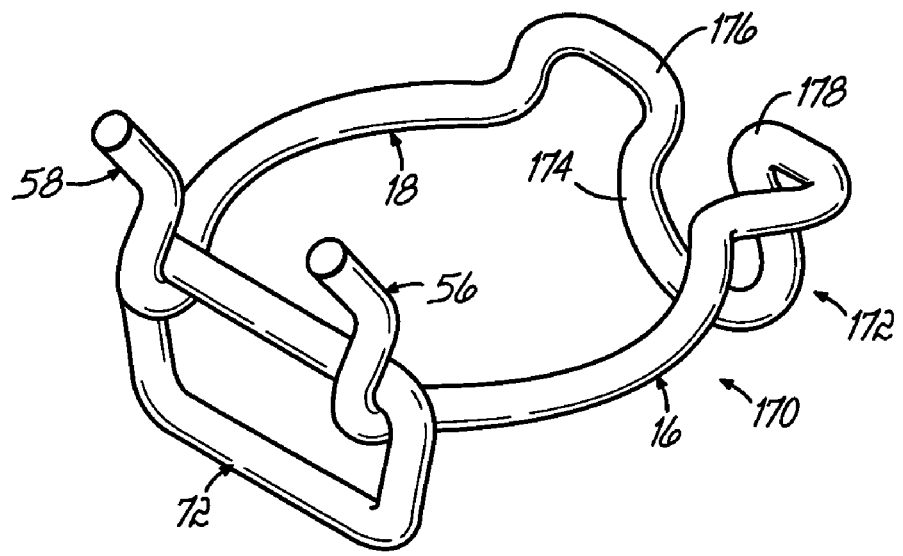
FIG. 13 is a perspective view of an alternative embodiment of a line hanger in accordance with the principles of the invention.

With reference to FIG. 13 in which like reference numerals refer to like features in FIGS. 1-3, a line hanger 170 is substantially the same or similar to line hanger 10 other than modifications made to attachment section 14. Specifically, line hanger 170 is provided with an attachment section 172 including a round or circular loop 174 substituted for the loop 24 of line hanger 10. Angled bends 176, 178 are bent such that the loop 174 extends in an opposite direction away from a plane containing the clamping arms 16, 18 compared with the direction in which upright members 56, 58 extend away from the plane containing the clamping arms 16, 18. The loop 174 receives a fastener (not shown) for securing the line hanger 170 to a support structure (not shown). The invention contemplates that the clamping arms 16, 18 may be coplanar with loop 174, may depend outwardly from loop 174 at an acute angle, may extend outwardly from loop 174 transversely at a right angle, or may depend outwardly from loop 174 at an obtuse angle.

Figure 14:
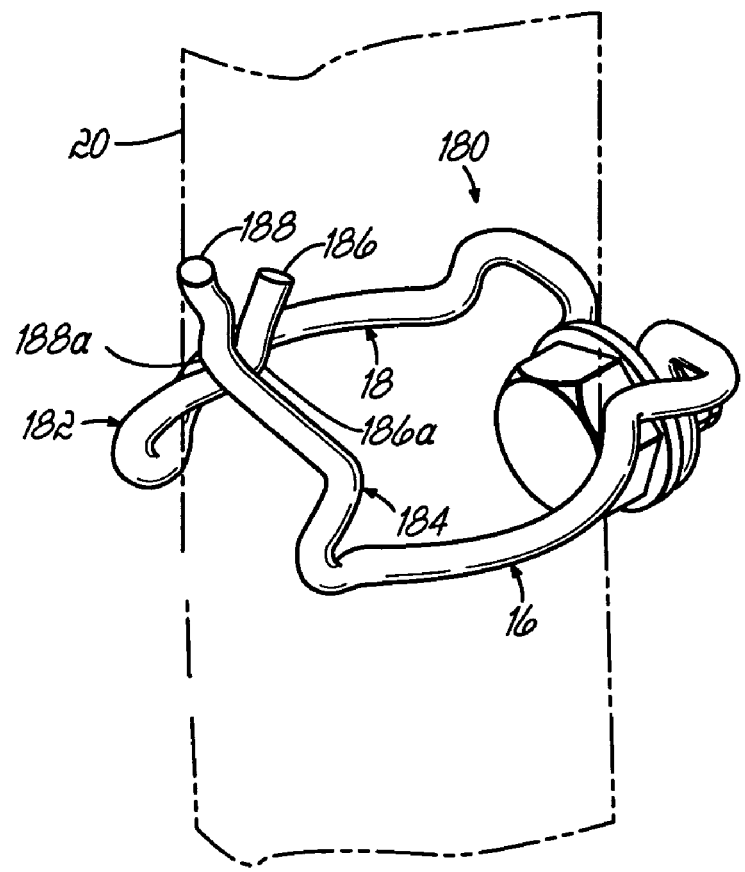
FIG. 14 is a perspective view of an alternative embodiment of a line hanger in accordance with the principles of the invention.
Figure 15:
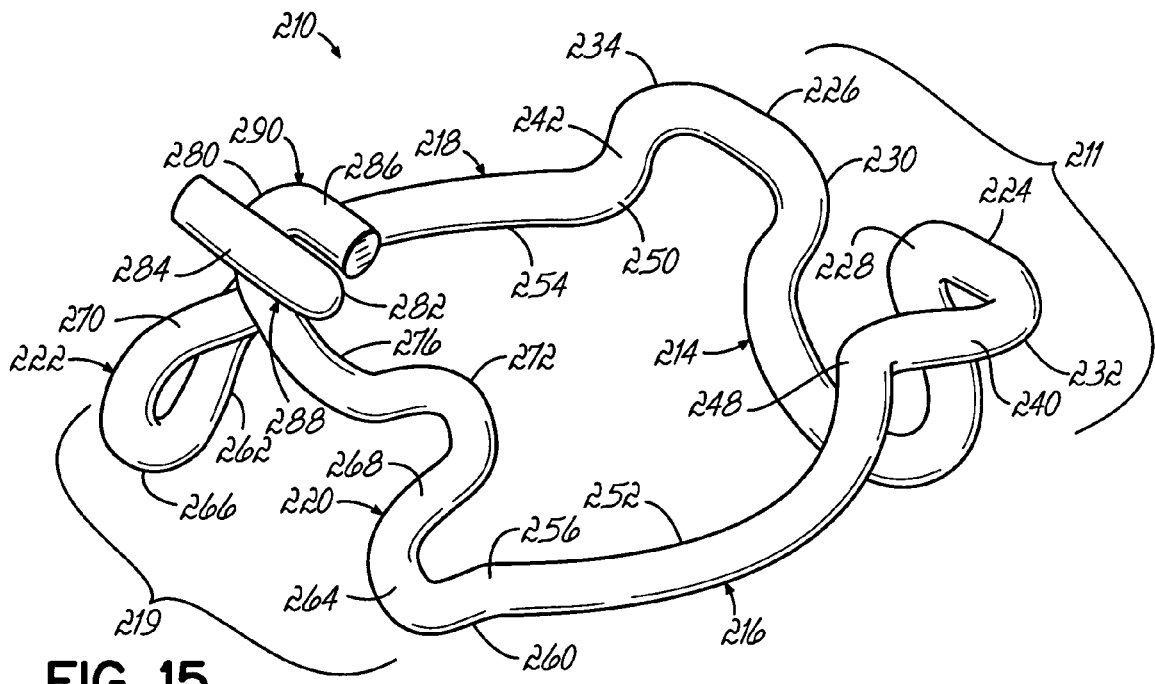
FIG. 15 is a perspective view of an alternative embodiment of a line hanger in accordance with the principles of the invention.

With reference to FIG. 14 in which like reference numerals refer to like features in FIGS. 1-3 and in an alternative embodiment, line hanger 180 may be provided with upright members 182, 184 that are capable of being interlocked to constrain the clamping arms 16, 18 against relative deflection as a substitute for terminating element 72 (FIG. 1). To that end, the upright members 182, 184 include respective twisted ends 186, 188 that may be interlocked after line 20 is inserted to constrain separation of the clamping arms 16, 18. Specifically, the upright members 182, 184 are resiliently flexible so that the twisted ends 186, 188 may be interlocked or coupled by mutual engagement of confronting concave portions of respective angled bends 186a, 186b. The twisted ends 186, 188 are inclined toward one another relative to the clamping arms 16, 18. It is appreciated that line hangers 150, 160, 170, 180 may participate in a stacked arrangement as described herein.

With reference to FIGS. 15-18 and in an alternative embodiment of the invention similar to the embodiment shown in FIG. 14, a line hanger 210 includes a support attachment provision or section 214, a pair of clamping arms 216, 218 of approximately equal length, and a pair of distal ends or locking arms 220, 222 each of which projects away from a corresponding one of the clamping arms 216, 218. The line hanger 210, which is similar to line hanger 180 (FIG. 4), is a wire structure, formed in a generally U-shaped configuration, with the support attachment section 214 located at a closed end 211 of the wire structure and locking arms 220, 222 located at an open end 219 of the wire structure. The line hanger 210 may be formed from the same materials as line hanger 10 (FIG. 1) and, more specifically, line hanger 210 may be formed from a continuous length of wire bent into a generally U-shaped configuration.

Figure 19:
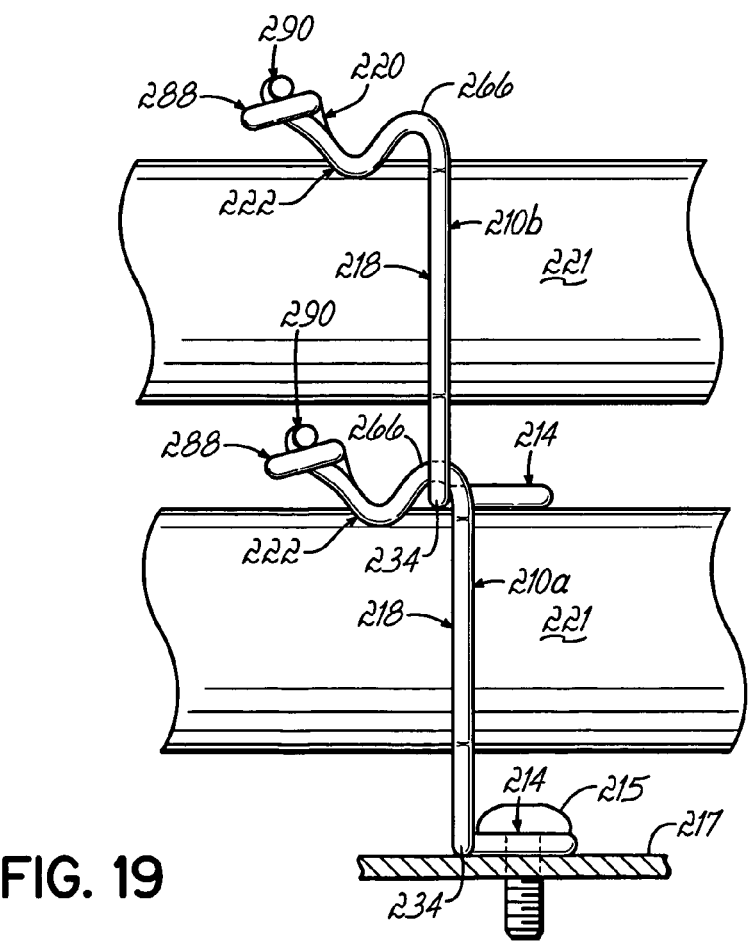
FIG. 19 is a perspective view showing a plurality of line hangers as in FIG. 15 joined together in a stacked configuration for holding multiple cables.
Figure 16:
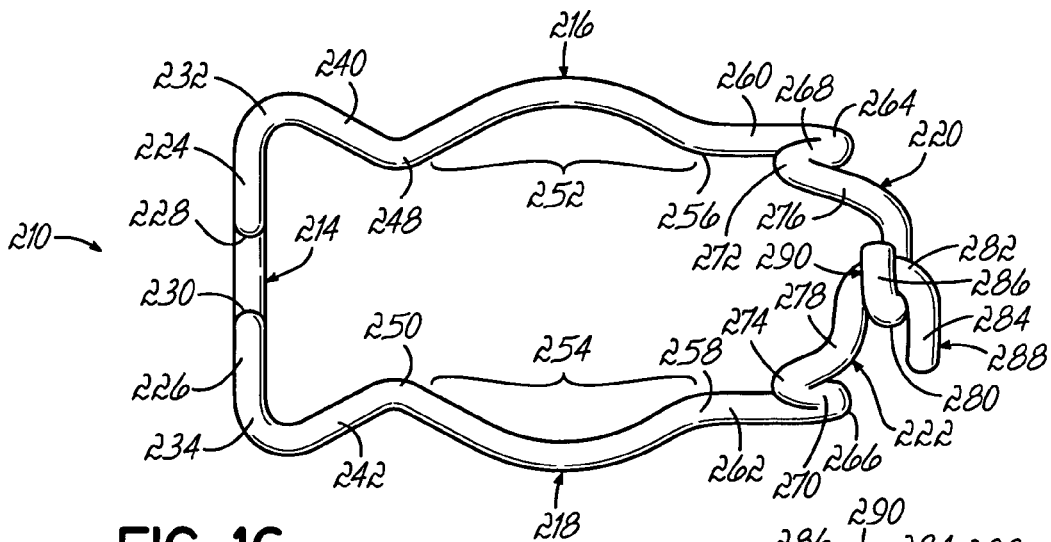
FIGS. 16, 17, and 18 are top, side and end views of the line hanger of FIG. 15.
Figure 17:
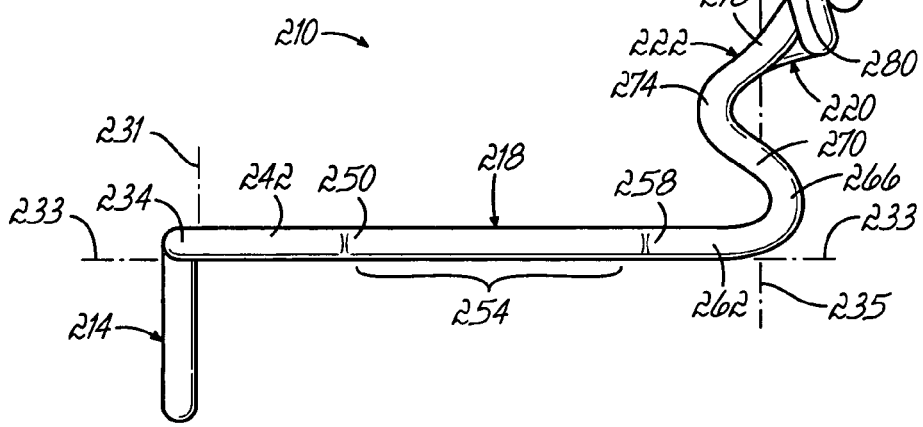
Figure 18:
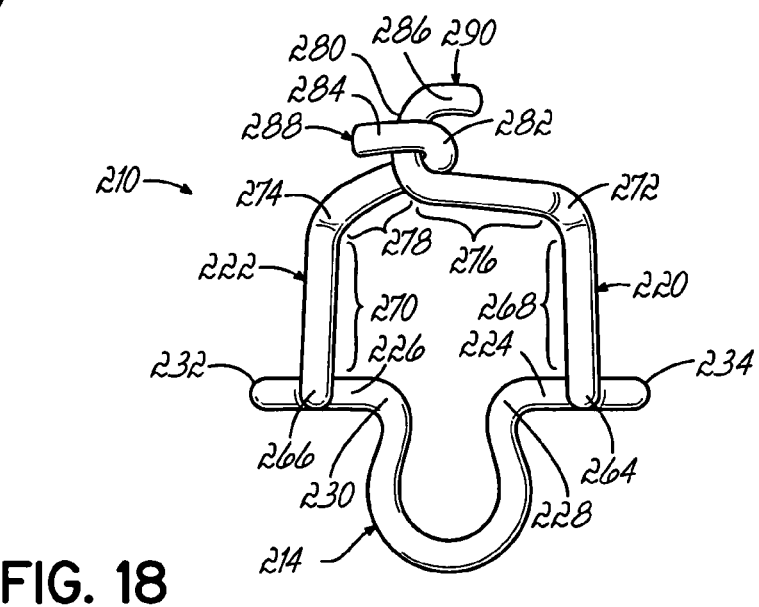

The locking arms 220, 222, which are similar to twisted ends 186, 188 of line hanger 180 (FIG. 14), are located at the opposite distal ends of the clamping arms 216, 218. The attachment section 214 projects away from the clamping arms 216, 218 in an opposite direction from the locking arms 220, 222, again similar to line hanger 180 (FIG. 14). The attachment section 214 may be secured by a conventional-style fastener 215 (FIG. 19) to a support structure 217 (FIG. 19). Alternatively, the attachment section 214 may be coupled with the clamping arms 216, 218 of another line hanger 210 for stacking multiple joined line hangers 210 in a row projecting from the support structure, as shown in FIG. 19.

The attachment section 214, which is shaped as a partially open loop, projects in a plane 231 (FIG. 17) that is angled or inclined, preferably at approximately 90°, relative to a plane 233 (FIG. 17) containing the clamping arms 216, 218. Typically, the planarity of the attachment section 214 provides a stable anchor for the line hanger 210, when mounted to the support structure 217, as a substantial portion, if not all, of the surface of attachment section 214 facing away from the clamping arms 216, 218 will be in contact with the support structure 217. This effectively positions the clamping arms 216, 218 in a stable position near the support structure 217, to which the attachment section 214 is attached, so that the moment arm of the line hanger 210 is reduced. This also minimizes the distance that stacked line hangers 210 project from the support structure 217. The planarity of the attachment section 214 also provides a stable support against a line 221 held by an adjacent line hanger 210 in a stacked configuration, as shown in FIG. 19.

Extending outwardly in opposite directions from the attachment section 214 are substantially-linear extension segments 224, 226 that are joined with the attachment section 214 by a corresponding one of a pair of angled bends 228, 230. The extension segments 224, 226 and angled bends 228, 230 are substantially co-planar with attachment section 214, the angled bends 228, 230 are obtuse angles, and the extension segments 224, 226 are substantially collinear and of approximately equal length. Each of the extension segments 224, 226 is coupled by a respective one of angled bends 232, 234 with a corresponding one of the clamping arms 216, 218. Angled bends 232, 234 supply a transition between the plane 231 of the attachment section 214 and the plane 233 containing the clamping arms 216, 218.

With continued reference to FIGS. 15-18, the angled bends 232, 234 are each continuous with a corresponding one of a pair of short bridging segments 240, 242 of approximately equal length. The bridging segments 240, 242, which each constitute a portion of one of the clamping arms 216, 218, space the attachment section 214 horizontally from the clamping arms 216, 218 to provide an empty space for receiving the head of the fastener 215 (FIG. 19). As a result, the head of the fastener 215 does not interfere with the securement of the line 221 (FIG. 19) with the line hanger 210 and is spaced from the secured line 221. The separation also facilitates stacking of multiple line hangers 210.

Each of the clamping arms 216, 218 includes a curved segment 252, 254 joined by a corresponding one of a pair of angled bends 248, 250 with a respective one of the bridging segments 240, 242. Curved segments 252, 254 contact the line 221 when the line hanger 210 is deployed in the field. Each corresponding pair of angled bends 232, 234 and angled bends 248, 250 defines one of a pair of double reverse bends, or S-shaped bend arrangements when considered along with the bridging segments 240, 242, near the closed end of the line hanger 210. The bend arrangements isolate the closed end 211 from the line 221 gripped by the clamping arms 216, 218. Specifically, the S-shaped bend arrangements provide open space between the attachment section 214 and the curved segments 252, 254 to receive the clasped locking arms 220, 222 of an adjacent stacked line hanger 210 and to isolate the fastener 215 from the line 221 held between curved segments 252, 254. This additional room promotes stacking of multiple line hangers 210 and is dimensioned to capture the locking arms 220, 222 of an adjacent line hanger, not shown but the same or similar to line hanger 210, at bends 256, 258.

The curved segments 252, 254 have a radius of curvature that promotes contact and a substantially frictional grip with the captured line 221 held by the line hanger 210. In certain embodiments, the radius of curvature of the curved segments 252, 254 may be greater than the diameter of the captured line 221, which spaces the engagement point of the line 221 away from the locking arms 220, 222. This permits the line hanger 210 to flex more after bottoming out on the line 221 and eases installation and removal of the line hanger 210.

Each of the curved segments 252, 254 is joined by a respective one of a pair of angled bends 256, 258 with a corresponding one of a pair of short linear segments 260, 262. These segments 260, 262 provide clearance between line 221 captured by curved segments 252, 254 and the locking arms 220, 222 for the insertion of the attachment section 214 of another line hanger 210 in a stacked configuration. The segments 260, 262 also flex, primarily in torsion, to permit the locking arms 220, 222 to be clasped after the curved segments 252, 254 have bottomed out with contact against line 221. The cross-sectional area of the segments 260, 262 may be thinned relative to other lengths of the line hanger 210 to increase the flexibility.

Angled bends 264, 266 provide a transition between the clamping arms 216, 218 and the locking arms 220, 222. The radius of curvature of the angled bends 264, 266 orients the locking arms 220, 222 in a substantially orthogonal plane 235 (FIG. 17) to the clamping arms 216, 218 so that the locking arms 220, 222 depend away from the plane 233 containing the curved segments 252, 254. Each of the locking arms 220, 222 includes a respective one of a pair of segments 268, 270 of approximately equal length that depend inwardly toward the attachment section 214. Each of the segments 268, 270 is joined by a respective one of a pair of angled bends 272, 274 with a corresponding one of another pair of segments 276, 278. Segments 276, 278 are each inclined outwardly and away from the corresponding one of segments 268, 270.

Angled bends 264, 266 change the direction of the rod material forming line hanger 210 relative to the plane 233 containing the clamping arms 216, 218 so as to permit the line hanger 210 to engage the angled bends 232, 234 of another line hanger 210 in a stacked configuration. The angled bends 232, 234 cooperate with angled bends 264, 266 to reduce the distance that a stacked set of line hangers 210 will project from support structure 217, which reduces wind resistance and minimizes the moment arm for the stacked line hangers 210. The angled bends 232, 234 flex, primarily torsionally, and provide a moment for clasping hooked members 288, 290, which cooperate with the flexibility of segments 260, 262 for permitting the hook members 288, 290 to be engaged after line 221 is positioned between the curved segments 252, 254. The angled bends 232, 234 also position the hooked members 288, 290 close to the captured line 221 for optimized compact stacking.

Each of the segments 276, 278 is joined by a respective one of angled bends 280, 282 with a segment 284, 286 for defining a corresponding curved hook member 288, 290 each terminating a distal end of a corresponding one of the locking arms 220, 222. The hook members 288, 290 are C-shaped and concave in opposition to one another so that the angled bends 280, 282 may be clasped or interlocked for interconnecting the locking arms 220, 222 and, thereby, to prevent separation between the clamping arms 216, 218 when gripping line 221. The depth of each hook member 288, 290 is measured from the free end of the respective segment 284, 286 to a center of a corresponding one of the angled bends 280, 282 and is adjusted to be as shallow as possible, which reduces the amount of pinching required to engage the hook members 288, 290 and place the angled bends 280, 282 in a contacting relationship. However, the depth of each hook member 288, 290 should suffice to prevent inadvertent separation after line 221 is captured. The principle difference between line hanger 210 and line hanger 180 (FIG. 14) is the presence of the C-shaped hook members 288, 290, which are shaped differently in line hanger 180 (FIG. 14) with a lesser degree of curvature.

The clamping arms 216, 218 are resiliently separable or spreadable between a relaxed condition, a spread condition, and a clasped position. In the relaxed condition, no line 221 is present and the hook members 288, 290 may be either engaged or disengaged. In the spread condition, line 221 may be inserted into a widened throat or gap between the resiliently separated locking arms 220, 222. In the clasped condition, the hook members 288, 290 are pinched together and engaged so that the angled bends 280, 282 are contacting, and each of the clamping arms 216, 218 applies an inwardly-directed clamping force for securing line 221 with the line hanger 210 and against axial movement relative to the line hanger 210.

To couple the line 221 with the line hanger 210, the attachment section 214 of line hanger 210 is mounted with fastener 215 to the support structure 217. The line 221 is positioned proximate the gap between the locking arms 220, 222 and moved inwardly in a direction generally toward the attachment section 214. Sliding contact between the exterior of the line 221 and the locking arms 220, 222 causes the clamping arms 216, 218 to resiliently deflect outwardly or separate from the relaxed condition to the spread condition so that the line 221 can pass between the locking arms 220, 222. The line 221 is moved between the clamping arms 216, 218, which progressively relax inwardly to establish the clamping condition in which the clamping arms 216, 218 apply an inward clamping force to the line 212. In the clamping condition, the hook members 288, 290 are mutually engaged or joined with a pinching and twisting motion, which prevents separation of clamping arms 216, 218. The clamping force applied by the clamping arms 216, 218 grips line 221 with a clamping force sufficient to prevent significant axial movement of the line 221 relative to line hanger 210.

With reference to FIG. 19 in which like reference numerals refer to like features in FIGS. 15-18, a plurality of, for example, two line hangers 210a, 210b each the same or similar to line hanger 210 may be stacked outwardly from the support structure 217. This stacked configuration is used to route multiple lines 221 in a compact manner across the support structure 217. The attachment section 214 at the closed end 211 of line hanger 210a is fastened to the support structure 217 with fastener 215, one of the lines 221 is inserted between the clamping arms 216, 218, and the clamping arms 216, 218 are engaged in the clasped position. The next line hanger 210b, and any subsequent line hangers, is engaged by positioning the corresponding attachment section 214 proximate to the space between the clamping arms 216, 218 of line hanger 210a and moving the attachment section 214 in a direction generally parallel with the length of the line 221 held by line hanger 210a. The attachment section 214 at the closed end 211 of line hanger 210b passes through the space between the clamping arms 216, 218 at the open end 219 of line hanger 210a and, ultimately, the angled bends 232, 234 of line hanger 210b contact the angled bends 264, 266 of line hanger 210a. Any potential rotation of line hanger 210b about the pivot points defined by contact between angled bends 232, 234 of line hanger 210b and angled bends 264, 266 of line hanger 210a is restricted by the contact between the attachment section 214 of line hanger 210b and the line 221 held by line hanger 210a. In other words, the attachment section 214 engages the line 221 held by line hanger 210a, and so on for successive line hangers, not shown but the same or similar to line hanger 210, stacked outwardly from line hanger 210b, to stabilize a stack of lines 221.

Line hanger 210 may be used in combination with various different support provisions, including but not limited to the support provisions disclosed in FIGS. 4-10. Line hanger 210 may also be configured, for example, with the attachment provision 214 and the locking arms 220, 222 projecting from the same side of a plane containing the clamping arms 216, 218 like line hanger 10 (FIG. 1).

The invention provides a one-piece, stackable line hanger capable of securing one or more lines to a support structure in a spatially compact manner. The line hanger of the invention is inexpensive to manufacture. The line hanger of the invention is quickly and easily installed because no auxiliary hardware, such as screws, bolts, nuts and washers, other than the fastener needed to mount a first line hanger to a support structure, is required. This reduces the number of components for securing the line and simplifies line installation. The line hanger of the invention may be used with few or no tools for mounting and coupling multiple hangers in a stacked fashion, which effects a considerable savings in labor and speeds installation. However, the invention contemplates that a tool may be used, for example, by an installer to engage clamping arms with twisted ends or hook members that are pinched together and engaged. When mounted to the support structure or to another line hanger, the line hanger resists rotation, displacement, cantilevering, and detachment.

While the present invention has been illustrated by a description of various preferred embodiments and while these embodiments have been described in considerable detail in order to describe the best mode of practicing the invention, it is not the intention of the applicants to restrict or in any way limit the scope of the appended claims to such detail. Additional advantages and modifications within the spirit and scope of the invention will readily appear to those skilled in the art. The invention itself should only be defined by the appended claims, wherein we claim:

The invention claimed is:

1. A stackable line hanger for supporting a line, comprising:
a wire structure formed into a generally U-shaped configuration including an end section, and a pair of bend arrangements a pair of clamping arms projecting from said end section, said clamping arms configured to grip the line when the line is positioned therebetween, a respective one of said arrangements disposed between each of said clamping arms and said end section, and said bend arrangements each including first, second, and third bends that cooperate to isolate said end section from the line supported by said clamping arms, said clamping arms each having a distal free end terminating said wire structure, and said distal free ends configured to interlock when the line is positioned between said clamping arms,
wherein said second bend of each of said bend arrangements is located between said first bend of the respective bend arrangement and one of said clamping arms, said third bend of each of said bend arrangements is located between said first bend of the respective bend arrangement and said end section, said third bend of each of said bend arrangements is angled outwardly relative to said end section, said first bend of each of said bend arrangements is angled inwardly relative to said third bend of the respective bend arrangement, said second bend of each of said bend arrangements is angled outwardly relative to said first bend of the respective bend arrangement, said clamping arms lie in a plane, said distal free ends of said wire structure are bent approximately 90° out of said plane at said open end to more closely space stacked lines, and each of said distal free ends includes a first bend and a second bend between said first bend and one of said clamping arms, said first and second bends of each of said distal free ends defining arc lengths of the wire structure that are curved in opposite first and second directions.

2. The stackable line hanger of claim 1 wherein said distal free ends are adapted to be joined with a pinching and twisting motion of said distal ends.

3. The stackable line hanger of claim 1 wherein said closed end of said wire structure includes an attachment section lying substantially in a plane orthogonal to a plane defined by said clamping arms.

4. The stackable line hanger of claim 3 wherein said attachment section includes a partial loop defined in said wire structure.

5. The stackable line hanger of claim 1 wherein said distal free end of each of said clamping arms is configured to retentively engage an end section of a similarly shaped interlocked line hanger.

6. A combination comprising a chain of interlocked line hangers, each of the lines hangers capable of supporting a line, each of the line hangers in the combination comprising:
  a wire structure formed into a generally U-shaped configuration including an end section a pair of clamping arms projecting from said end section, said clamping arms configured to grip the line when the line is positioned therebetween, and said clamping arms each having a distal free end terminating said wire structure, said distal free ends configured to interlock when the line is positioned between said clamping arms,
  wherein said clamping arms lie in a plane, said distal free ends of said wire structure are bent out of said plane at said open end to more closely space stacked lines, and each of said distal free ends includes a first bend and a second bend between said first bend and one of said clamping arms, said first and second bends defining arc lengths of the wire structure that are curved in opposite first and second directions.

7. The combination of claim 6 wherein said clamping arms of each line hanger in said chain of hangers grip a corresponding one of a plurality of retained lines.

8. The combination of claim 6 wherein each of said line hangers has a multifunctional bend formation proximate to said end section, said multifunctional bend formation lying substantially in a plane orthogonal to a plane defined by said clamping arms.

9. The combination of claim 8 wherein said multifunctional bend formation comprises a partial loop which serves as a mounting provision for a first line hanger of the chain, and which engages an adjacent line in successive line hangers to stabilize the stack of lines.

* * * * *

UNITED STATES PATENT AND TRADEMARK OFFICE
CERTIFICATE OF CORRECTION

PATENT NO. : 7,766,285 B2  Page 1 of 1
APPLICATION NO. : 11/033007
DATED : August 3, 2010
INVENTOR(S) : Albert R. Cox It is certified that error appears in the above-identified patent and that said Letters Patent is hereby corrected as shown below:

Line 12 of the abstract in column 2 of the cover page, change "for support" to --for supporting--.

In the References Cited Section on Page 2, insert the following references cited in the June 23, 2005 Information Disclosure Statement;
2002/0005463 A1 01/2002 Paske et al...........248/74.1
2002/0130237 A1 09/2002 Kluser et al.......... 248/316.1
Erico International, CADDY Conduit Product Catalog (Pages 10-13, 58-73, 82-83,128-133) (Undated)
European Search Report, Received 01/20/2004

In column 5:
Line 7, change "does" to --do--
Line 13, change "of" to --or--.

In column 10:
Line 50, change "place" to --places--
Line 53, change "principle" to --principal--.

In column 12, line 28, Claim 1, after "arrangements", insert --,--.

In column 13:
Line 9, Claim 6, change "lines" to --line--
Line 12, after "section", insert --,--.

Signed and Sealed this

Thirtieth Day of November, 2010

David J. Kappos
*Director of the United States Patent and Trademark Office*